US012641287B2

(12) United States Patent
Li

(10) Patent No.: US 12,641,287 B2
(45) Date of Patent: \*May 26, 2026

(54) SYSTEMS AND METHODS FOR ENCODING THREE-DIMENSIONAL MEDIA CONTENT

(71) Applicant: Adeia Guides Inc., San Jose, CA (US)

(72) Inventor: Zhu Li, Overland Park, KS (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/924,670

(22) Filed: Oct. 23, 2024

(65) Prior Publication Data

US 2025/0056044 A1 Feb. 13, 2025

Related U.S. Application Data

(63) Continuation of application No. 17/896,755, filed on Aug. 26, 2022.

(51) Int. Cl.
| | |
|---|---|
| *H04N 19/597* | (2014.01) |
| *H04N 19/105* | (2014.01) |
| *H04N 19/124* | (2014.01) |
| *H04N 19/172* | (2014.01) |
| *H04N 19/177* | (2014.01) |
(Continued)

(52) U.S. Cl.
CPC ......... *H04N 19/597* (2014.11); *H04N 19/105* (2014.11); *H04N 19/124* (2014.11); *H04N 19/172* (2014.11); *H04N 19/177* (2014.11); *H04N 19/186* (2014.11);
(Continued)

(58) Field of Classification Search
CPC .. H04N 19/597; H04N 19/105; H04N 19/124; H04N 19/172; H04N 19/177; H04N 19/186; H04N 19/187; H04N 19/30; H04N 19/42
See application file for complete search history.

(56) References Cited

U.S. PATENT DOCUMENTS

| | | |
|---|---|---|
| 12,125,143 B2 | 10/2024 | Li |
| 2002/0176622 A1 | 11/2002 | Watanabe et al. |
(Continued)

OTHER PUBLICATIONS

Gersho et al., "Vector Quantization and Signal Compression", Springer, New York, 1992 (737 pages).
(Continued)

*Primary Examiner* — Jae N Noh
(74) *Attorney, Agent, or Firm* — HG LAW LLP

(57) ABSTRACT

Systems and methods are provided for encoding a frame of 3D media content. The systems and methods may be configured to access a first frame of 3D media content and generate a data structure for the first frame based on color attributes information of the first frame, wherein each element of the data structure encodes a single color. The systems and methods may be configured to train a machine learning model based on the first frame of 3D media content, wherein the machine learning model is trained to receive as input a coordinate of a voxel of the first frame, and to output an identifier of a particular element in the generated data structure. The systems and methods may be configured to generate encoded data for the first frame based at least in part on weights of the trained machine learning model and the generated data structure.

20 Claims, 8 Drawing Sheets

(51) Int. Cl.

| | |
|---|---|
| *H04N 19/186* | (2014.01) |
| *H04N 19/187* | (2014.01) |
| *H04N 19/30* | (2014.01) |
| *H04N 19/42* | (2014.01) |

(52) U.S. Cl.

CPC ........... *H04N 19/187* (2014.11); *H04N 19/30* (2014.11); *H04N 19/42* (2014.11)

(56) References Cited

U.S. PATENT DOCUMENTS

| | | | |
|---|---|---|---|
| 2008/0082426 A1 | 4/2008 | Gokturk et al. | |
| 2015/0195548 A1* | 7/2015 | Wang | H04N 19/105 375/240.12 |
| 2016/0198164 A1* | 7/2016 | Lin | H04N 19/18 375/240.2 |
| 2018/0204111 A1 | 7/2018 | Zadeh et al. | |
| 2023/0394762 A1 | 12/2023 | Li | |
| 2024/0073452 A1 | 2/2024 | Li | |

OTHER PUBLICATIONS

Isik et al., "LVAC: Learned Volumetric Attribute Compression for Point Clouds using Coordinate Based Networks," (Nov. 17, 2021).

Isik, "Neural 3D Scene Compression via Model Compression," Stanford University, Final Project (May 7, 2021).

Kathariya et al., "Gradient Compression with a Variational Coding Scheme for Federated Learning," 2021 International Conference on Visual Communications and Image Processing (VCIP), pp. 1-5, doi: 10.1109/VCIP53242.2021.9675436 (2021).

Li et al., "Advanced 3D Motion Prediction for Video Based Dynamic Point Cloud Compression," IEEE Transactions on Image Procesing (2019) (14 pages).

Li et al., "Guest Editorial Introduction to the Special Issue on Recent Advances in Point Cloud Processing and Compression," IEEE Transactions on Circuitts and Systems for Video Technology, 31(12):4555-4560 (2021).

Mildenhall et al., "NeRF: Representing Scenes as Neural Radiance Fields for View Synthesis," ECCV (2020) (https://arxiv.org/abs/ 2003.08934) (25 pages).

Neural Radiance Field (NeRF): A Gentle Introduction (12 pages) (downloaded Nov. 10, 2022) (https://datagen.tech/guides/synthetic- data/neural-radiance-field-nerf/).

PCT International Search Report and Written Opinion mailed Oct. 27, 2023 in connection with PCT/US2023/030797 (16 pages).

Pumarola et al., "D-NeRF: Neural Radiance Fields for Dynamic Scenes," Institute of Robotics Information Industrial, CSI-UPC, Max Planck Institute for Informatics (Nov. 27, 2020).

Pumarola et al., "D-NeRF: Neural Radiance Fields for Dynamic Scenes," CVPR 2021: 10318-10327 (https://openaccess.thecvf.com/ content/CVPR2021/papers/Pumarola_D-NeRF_Neural_Radiance_ Fields_for_Dynamic_Scenes_CVPR_2021_paper.pdf) (10 pages).

Rahimi et al., "Random features for large-scale kernel machines," Proc of NIPS, 2007 (8 pages).

Tojo et al., "Recolorable Posterization of Volumetric Radiance Fields Using Visibility-Weighted Palette Extraction," The University of Tokyo, Computer Graphics Forum 2022.

U.S. Appl. No. 17/829,734, filed Jun. 1, 2022 (not submitted).

Wang et al.,"Multiscale Point Cloud Geometry Compression," 2021 Data Compression Conference (10 Pages).

Xian et al., Space-Time Neural Irradiance Fields for Free-Viewpoint Video. CVPR 2021: 9421-9431 (11 pages).

Xie et al., "Neural Fields in Visual Computing and Beyond," https://neuralfields.cs.brown.edu/ (Nov. 22, 2021).

* cited by examiner

200

Color Table

| | R | G | B |
|---|---|---|---|
| 202 | 100 | 209 | 59 |
| 204 | 117 | 57 | 61 |

. . .

| | | | |
|---|---|---|---|
| 206 | 0 | 0 | 0 |
| 208 | 0 | 39 | 135 |
| 210 | 75 | 199 | 253 |

K x 3

212 — R
214 — G
216 — B

220

| PCD | No. Of Cluster | | | | |
|---|---|---|---|---|---|
| | 256 | 128 | 64 | 32 | 16 |
| soldier | 46.27 | 43.65 | 40.87 | 38.14 | 35.48 |
| redandblack | 40.11 | 38.09 | 35.95 | 33.71 | 31.35 |
| longdress | 35.95 | 33.78 | 31.49 | 29.10 | 26.69 |
| loot | 46.83 | 44.44 | 41.75 | 38.45 | 34.71 |
| queen | 44.01 | 41.46 | 38.42 | 35.15 | 31.20 |

222 — 256
224 — 128
226 — 64
228 — 32
230 — 16

INTRA coding with SoftMax-NeRF network

SYSTEMS AND METHODS FOR ENCODING THREE-DIMENSIONAL MEDIA CONTENT

CROSS-REFERENCE TO RELATED APPLICATION

This application is a continuation of U.S. patent application Ser. No. 17/896,755, filed Aug. 26, 2022, the disclosure of which is hereby incorporated by reference herein its entirety.

BACKGROUND

This disclosure is directed to systems and methods for encoding video frames, where color attributes information for voxels is encoded via one or more machine learning models. In some embodiments, systems and methods for encoding video frames are provided that allow for intra-coding and inter-coding of the video frames, to reduce required storage space for, and/or network resources required to transmit, encoded data for the video frames.

SUMMARY

Advancements in computerized video processing technology have enabled expanded use of complex video that takes advantage of captured three-dimensional (3D) data. For example, memory-dense 3D video data can be obtained using live motion capture (e.g., when an actor wears markers or sensors on a bodysuit). In another example, 3D virtual environments may require memory-dense storage of 3D video data for use in Augmented Reality (AR) or Virtual Reality (VR) applications. For example, a 3D model 10-bit geometry in three dimensions (e.g., [x, y, z] directions) and 8-bit red-green-blue (RGB) color attributes may require storage of 700K to 1 M voxels to define geometry and color of each voxel of the model for each frame of video media content. Accordingly, storage of such massive amounts of information, which may be uncompressed, is taxing on storage systems and is very computationally intensive. Moreover, an attempt to transmit such data via a network is extremely bandwidth-demanding and may cause network delays and unacceptable latency.

To address these problems, systems and methods are provided herein that efficiently code geometry information for voxels of a frame in 3D media content (e.g., to enable recovery of a frame by mapping a voxel location (e.g., defined by x, y, z coordinates) to a generated data structure encoding a single color for a particular voxel (e.g., using RGB color coding, cyan, magenta, yellow, black (CMYK) color coding, hex color coding, hue, saturation, lightness (HSL) color coding, or any other suitable color coding, or any combination thereof). In some embodiments, the geometry is coded using one or more machine learning models (e.g., fully connected neural networks) defined by their weights. In some embodiments, such one or more machine learning models may be configured to learn vector quantized color representations for color attributes of voxels of a particular frame, to allow for classification learning. Encoded data may be generated based at least in part on the weights of the machine learning model and the generated data structure. Such techniques enable intra-coding and inter-coding storage savings to be achieved for each frame and between frames. For example, such savings may be achieved at least in part by enabling a machine learning model to be generated with reduced complexity (e.g., by reducing the number of trainable weights) to enhance encod-ing and/or compression efficiency, and/or by re-using the weights of the trained machine learning model for additive layers of the machine learning model to process subsequent frames. In some embodiments, the aspects disclosed herein may be used for dynamic point cloud compression, which may be applicable to various applications, such as, for example, a metaverse environment.

In some embodiments, a computing system (e.g., using a codec application) may access a first frame (e.g., any selected frame) of 3D media content. The codec application may generate a data structure (e.g., a color table) for the first frame based on color attributes information (e.g., RGB values) of the first frame, wherein each element of the data structure may encode a single color. In some embodiments, the data structure may be generated by applying vector quantization to the color attributes to obtain vector quantized color representations for color attributes of voxels of a particular frame.

In some embodiments, the codec application may train a machine learning model based on the first frame of 3D media content. The machine learning model may be trained to receive as input a coordinate of a voxel of the first frame, and to output an identifier of a particular element in the generated data structure. For example, the voxel may be included as part of voxel geometry information which may define all voxels in the frame by their 3D location (e.g., three coordinate values), which may be associated with corresponding color attributes information. The codec application may then further generate encoded data for the first frame based at least in part on weights of the trained machine learning model and storing the generated data structure (e.g., a color table). In some embodiments, each of the weights of the trained machine learning model and the stored color table are used, e.g., by a decoding device, in recovering the color for a voxel of a particular frame.

In some embodiments, the codec application may generate the data structure by applying vector quantization to the color attributes information of the first frame. In some embodiments, the data structure is a color table, and the particular element is a row or column of the color table. In some embodiments, the machine learning model may accept the voxel geometry as input, and may be trained to learn a mapping function between geometry and color attributes, via a vector quantized color table. Such features may significantly reduce the network complexity and lead to intra-coding gains. In some embodiments, the machine learning model may employ a NeRF (e.g., neural radiance field) network with a softmax loss function to learn vector quantized color attributes. In some embodiments, the codec application may preprocess the input to the machine learning model using a Fourier embedding layer. The machine learning model may enable efficient attributes matching while minimizing the number of trainable weights of the network. In some embodiments, the quality of the coded images can be controlled dynamically with different vector quantified color table size and network depth and size.

In some embodiments, applying the vector quantization comprises applying K-means clustering to the color attributes information of the first frame.

In some aspects of this disclosure, generating the data structure comprises applying vector quantization to color attributes of a plurality of sequential frames of the 3D media content, the plurality of sequential frames including the first frame.

In some embodiments, the codec application may be further configured to generate a group of pictures (GOP) comprising the plurality of sequential frames, wherein the GOP is associated with the data structure. In some embodiments, the vector quantized color quantization scheme may be employed in connection with the GOP, which may be associated with a dynamic point cloud. In some embodiments, each of the weights for the trained network and the color table may be re-used for subsequent frame(s), thereby achieving intra-coding savings.

In some aspects of this disclosure, the codec application may be further configured to cause the machine learning model to learn the weights for a plurality of layers of the machine learning model in association with receiving input of the first frame by adjusting the weights based on a comparison between the output of the machine learning model and color attributes information of the first frame. In some embodiments, the adjusting is repeated until a certain performance level is achieved.

In some embodiments, the 3D media content comprises a second frame sequential to the first frame in the 3D media content. The codec application may be further configured to generate encoded data for a second frame by re-using the weights learned by the machine learning model for the plurality of layers in association with receiving input of the first frame. The codec application may be further configured to generate encoded data for a second frame by updating the machine learning model by adding one or more additional layers to the plurality of layers and learning weights associated with the one or more additional layers in association with receiving input of the second frame. In some embodiments, the updating comprises adjusting the weights associated with the one or more additional layers based on a comparison between the output of the machine learning model and color attributes information of the second frame, and the updating is repeated until a certain performance level is achieved.

In some embodiments, the additive layer scheme may be used to perform inter-coding of frames, e.g., by re-using the previous frame trainable network weights, and only re-training the last layer or layers (e.g., additional layers added to the machine learning model) for inter-coding. Such aspect may significantly reduce the bit rate for encoding of successive inter-frames by re-using the reference frame weights, and may significantly reduce the bit rate for representing the one or more machine learning models.

In some aspects of this disclosure, the codec application may be further configured to transmit the encoded data to a client device, the encoded data comprising an indication of the coordinate of the voxel of the first frame, the stored weights, and the generated data structure (e.g., a color table).

In some embodiments, the transmitting of the encoded data causes the client device to generate the trained machine learning model using the received weights to determine color attributes information for the first frame. Such determining of the color attributes information for the first frame may comprise inputting the coordinate of the voxel of the first frame into the trained machine learning model. Such trained machine learning model may output an identifier of a particular row in the generated data structure, and may use the received data structure and the output identifier to determine the color attributes information for the first frame. The codec application may generate for display the first frame of the 3D media content based on the determined color attributes information.

In some aspects of this disclosure, the machine learning model comprises a softmax layer configured to output probabilities that respective candidate identifiers in the data structure correspond to color attributes of the input coordinate, and a size of the softmax layer may be based on a size of the data structure.

As a result of the use of these techniques, 3D media content may be efficiently encoded for storage and/or for transmission and/or processing.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figures 1A, 1B:
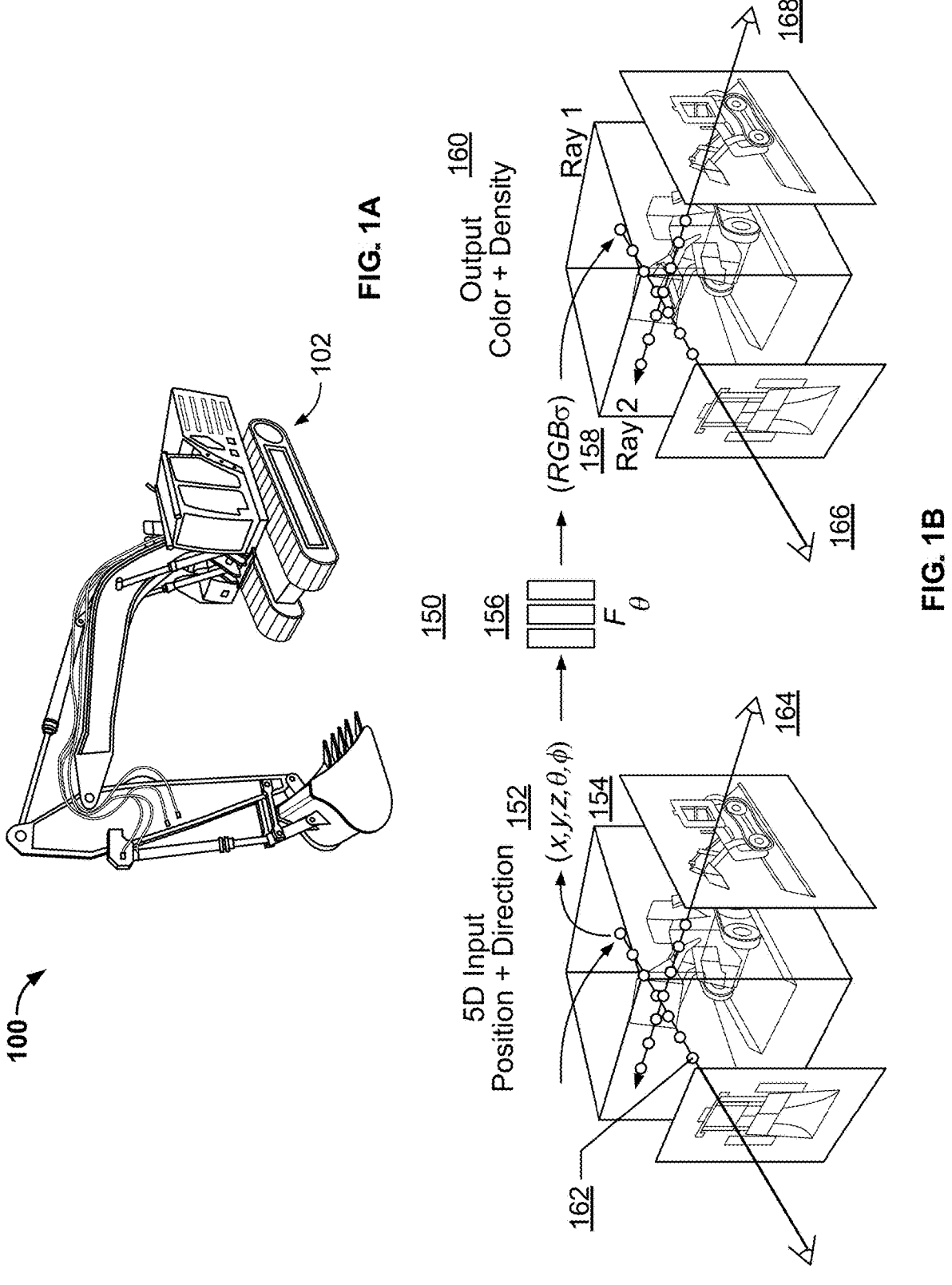
FIG. 1A shows an illustrative frame of 3D media content, in accordance with some embodiments of this disclosure.
FIG. 1B shows a view of an example of encoding 3D media content data using a machine learning model, in accordance with some embodiments of this disclosure.

FIG. 1A shows an illustrative frame 102 of 3D media content 100, in accordance with some embodiments of this disclosure. In some embodiments, 3D media content 100 may comprise any suitable number of frames. Such frames may be represented by way of a computed 3D mesh or 3D point cloud, e.g., a set of coordinates in a three-dimensional coordinate system that represents the external surface of an object, and that may contain depth information for each volumetric picture element (voxel) of 3D media content 100. For example, each voxel may be a cube comprising x-axis coordinates, y-axis coordinates and z-axis coordinates (e.g., depth information) within a frame of 3D media content 100. In some embodiments, color information and depth information (RGB-D), and/or spatial information and/or texture information and/or reflectance information and/or any other suitable information may be specified for each voxel over any suitable number of frames of 3D media content 100. In some embodiments, a data structure associated with frame 102 may specify the position of the voxels in frame 102 of 3D media content 100.

Figure 5:
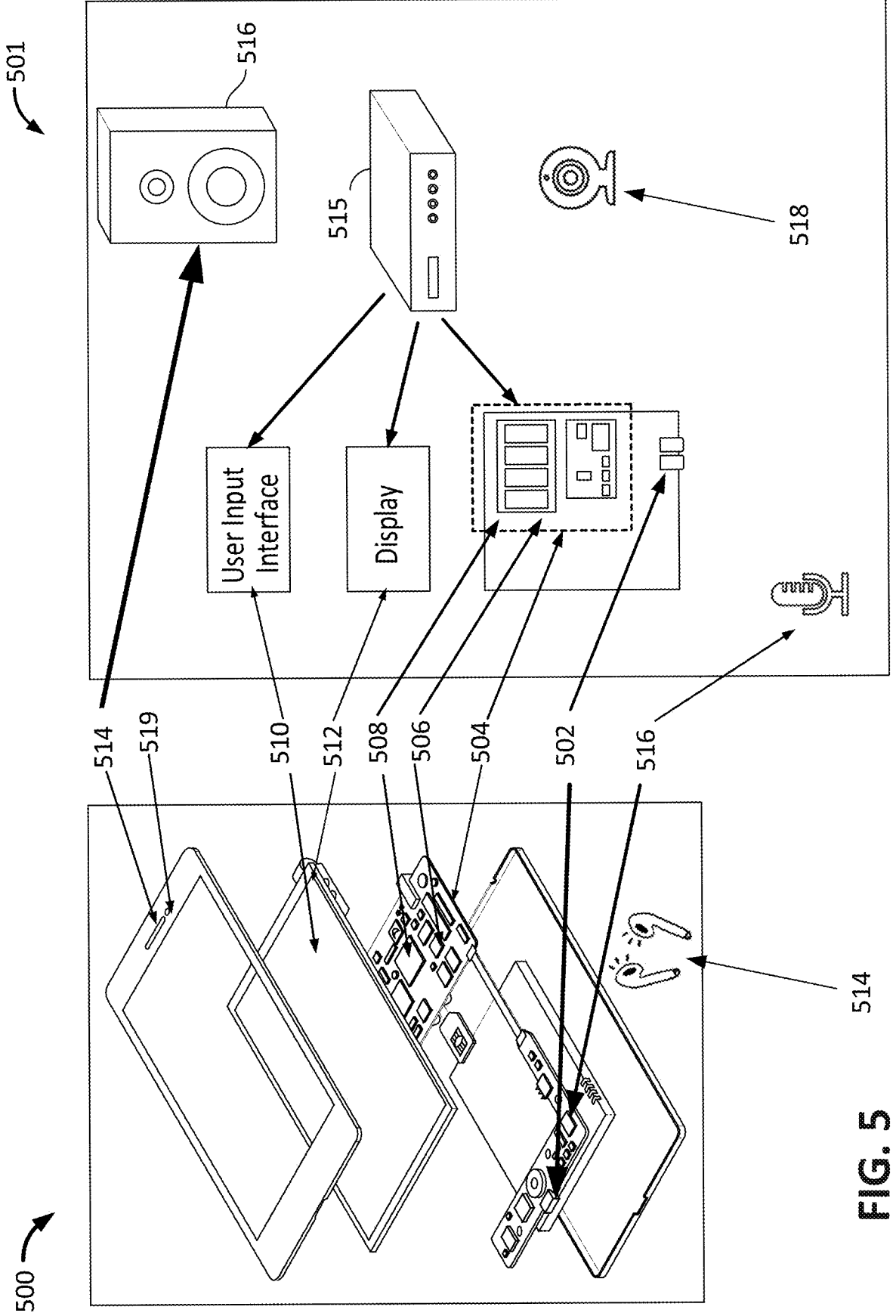
FIG. 5 shows an illustrative user equipment device, in accordance with some embodiments of this disclosure.
Figure 6:
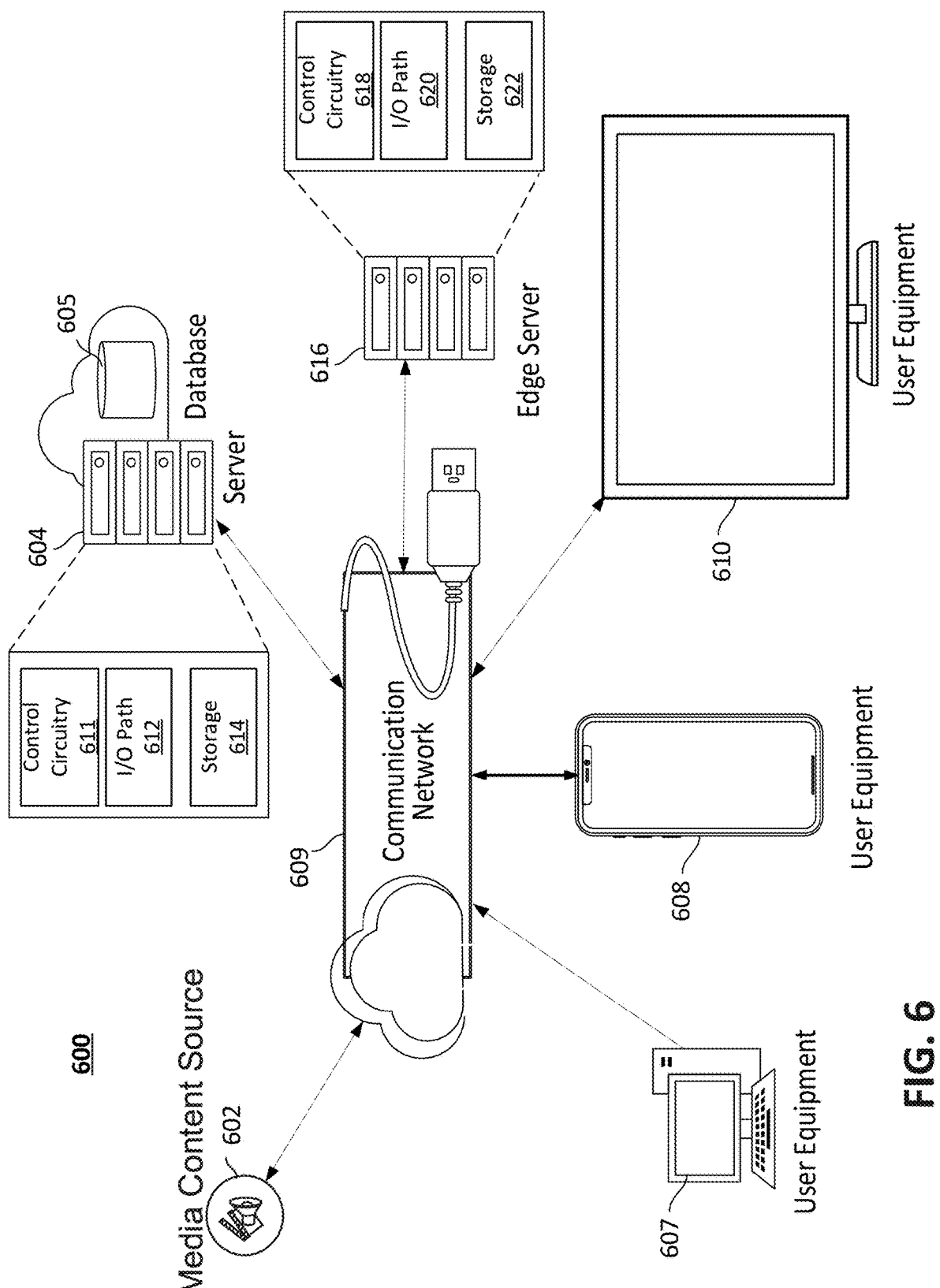
FIG. 6 shows an illustrative system, in accordance with some embodiments of this disclosure.

An encoder/decoder (codec) application (e.g., executing on one or more of any suitable number of computing devices, such as, for example, user equipment 500 and/or 501 of FIG. 5, and/or media content source 602, server 604, and/or user equipment 607, 608 and/or 610 of FIG. 6) may be configured to access one or more frames of 3D media content 100. In one approach, the codec application may encode 3D frame 102 based at least in part on (e.g., by storing) each portion of voxel data individually, such as, for example, as a table of horizontal, vertical and depth coordinates (x, y, z, coordinates) associated with color data (e.g., 3-value red, green, blue color data). At render time, the codec application may perform live rendering based on voxel data (e.g., using ray tracing) to render the voxel data from a certain angle. Such voxel data may be used instead of vector-based graphics, e.g., when 3D data is generated using live motion capture. In one approach, the voxel data may be encoded using a High Efficiency Video Coding (HEVC) codec scheme. One type of example technique for HEVC encoding is described by L. Li, et al., "Advanced 3D Motion Prediction for Video-Based Dynamic Point Cloud Compression," in IEEE Transactions on Image Processing, vol. 29, pp. 289-302, 2020, the contents of which is hereby incorporated by reference herein in its entirety.

As referred to herein, compression and/or encoding of media content may be understood as any suitable combination of hardware and/or software configured to perform bit reduction techniques on digital bits of the media content in order to reduce the amount of storage space required to store the media content. Such techniques may reduce the bandwidth or network resources required to transmit the media content over a network or other suitable wireless or wired communication medium and/or enable bitrate savings with respect to downloading or uploading the media content. Such techniques may encode the media content such that the encoded media content may be represented with fewer digital bits than the original representation while minimizing the impact of the encoding or compression on the quality of the media content. In some embodiments, the encoding of the media content may employ a hybrid video coder such as, for example, the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

FIG. 1B shows a view of an example 150 of encoding 3D media content data (e.g., data of frame 102) using a machine learning model, in accordance with some embodiments of this disclosure. In this approach, the codec application may train a machine learning model $F_\Theta$ 156 to efficiently encode color attributes information of 3D data used to generate frame 102. For example, the codec application may train machine learning model $F_\Theta$ 156 to receive as input coordinates [x, y, z] 152 and view angle [theta, phi] 154. The input coordinates may correspond to voxels along one of the rays 164 or 162. Machine learning model $F_\Theta$ 156 may output color attributes information 158. Color attributes information may comprise red, green, and Blue values (RGB) of a voxel as well as density (σ) of the color as viewed on one of the rays 166 or 168 (which may correspond to rays 162 or 164, respectively). By iterating through multiple rays, an entire 2D frame may be constructed by the codec application based on 3D voxel data. For example, view 150 shows two 2D images of the 3D model shown in FIG. 1A.

Figure 2A:
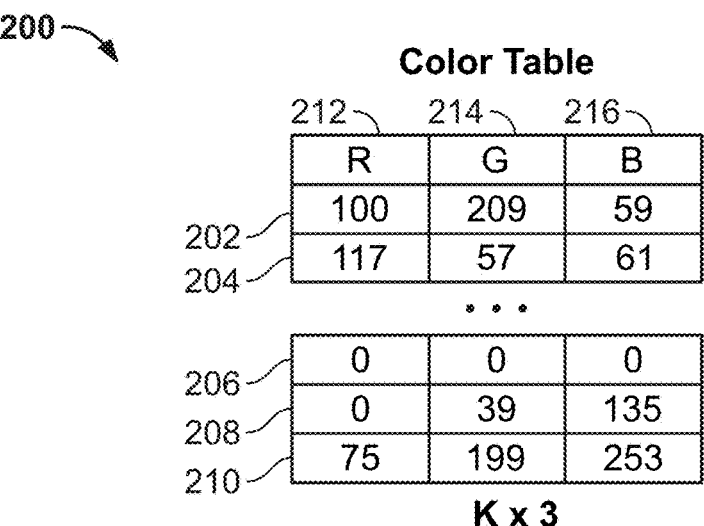
FIG. 2A shows an illustrative data structure generated for at least one frame of 3D media content, based on color attributes information of the at least one frame, in accordance with some embodiments of this disclosure.

FIG. 2A shows an illustrative data structure generated for at least one frame of 3D media content, based on color attributes information of the at least one frame, in accordance with some embodiments of this disclosure. In some embodiments, the codec application may be configured to generate data structure 200, which may be, for example, a color table. In some embodiments, data structure 200 may correspond to any suitable data structure, e.g., a table, a tree, a database, a record, an array, a linked list, a graph, a stack, a queue, or any other suitable data structure, or any combination thereof. The codec application may generate data structure 200 for one or more frames of 3D media content using one or more of any suitable computer-implemented technique. In generating data structure 200, the codec application may leverage the observation that frames of content generally utilize a limited number of colors from among a total number of possible available colors. Such limited number of colors utilized in the frame may be similar to each other (e.g., at certain portions of the frame, and/or at certain portions of nearby frames). The codec application may generate an efficient data structure 200 which specifies many fewer colors than the total number of colors available for rendering, while at the same time minimizing the loss of color fidelity.

In some embodiments, in generating data structure 200, the codec application may access the one or more frames in their raw, uncompressed form. For example, the accessed frames may have a 24-bit RGB color depth that uses 24-bits of information for each voxel, based on each component R, G, and B of the voxel using 8 bits to indicate the color of the voxel, or such voxels may have any other suitable color depth. Such 24-bit RGB color depth scheme results in roughly 16.78 million color variations, i.e., 256×256×256, based on each 8-bit R, G and B component having a range of possible values of 0-255. While 24-bit color depth enables 16.78 million different colors to be specified, frames of 3D media content generally use a limited number of such colors, and certain colors may be concentrated at certain portions within the frame or within certain portions across multiple frames. In some embodiments, the color attributes information for the one or more frames may correspond to, for example, RGB values, CMYK values, hex color values, HSL values, or any other suitable set of values, or any combination thereof.

The codec application may apply any suitable quantization technique, e.g., vector quantization, to a frame(s) of the 3D media content to selectively reduce the number of colors (e.g., from the roughly 16.78 million possible variations associated with the 24-bit color depth rendition) used in the one or more frames to represent an object or entity or other portion therein. For example, the codec application may reduce the 24-bit color depth rendition of the one or more frames (e.g., depicting a 3D model of a soldier 236 and/or a 3D model of a person 232, 234, 238 and/or 240 shown in FIG. 2B) to 8-bit color depth indicated at 222 (e.g., 256 possible RGB color values), 7-bit color depth indicated at 224 (e.g., 128 possible RGB color values), 6-bit color depth indicated at 226 (e.g., 64 possible RGB color values), a 5-bit color depth indicated at 228 (e.g., 32 possible RGB color values), a 4-bit color depth indicated at 230 (e.g., 16 possible RGB color values) or any other suitable color depth or any combination thereof. The large set of the 24-bit color depth RGB values may be represented as vectors having R, G and B components, and may be mapped by the codec application into a reduced set of vectors indicated at 222, 224, 226, 228, 230 (where K=256, 128, 64, 32 or 16, respectively).

In some embodiments, the codec application may reduce the color depth of the accessed one or more frames of the 3D media content and generate data structure 200 by applying a K-means clustering algorithm and/or any other suitable algorithm or technique to the accessed one or more frames, e.g., octree color quantization, median cut algorithm, uniform quantization, popularity quantization, or any other suitable technique, or any combination thereof. In some embodiments, each frame in a sequence (e.g., a group of pictures (GOP) or other set of frames sequential in time or other sequence of frames) with N points as input may be clustered via a K-means algorithm to find the best K-color representation in a color table, e.g., data structure 200. In some embodiments, a color table of a particular size K×3 may be included or indicated in a bitstream corresponding to encoded data for 3D media content, e.g., to be transmitted to a client device requesting access to one or more frames associated with data structure 200. The codec application, by quantizing the color of a given frame (e.g., via vector quantization), can obtain a compact K-color table representation with controllable quantization loss. In some embodiments, the codec application may apply vector quantization to each object in a particular frame or frames.

A GOP may be understood as a set of frames coded together, and including any suitable number of key and predictive frames, where a key frame may be an I-frame or intra-coded frame representing a fixed image that is independent of other views or pictures, and predictively coded frames may contain different information indicating distinctions from the reference I-frame. For example, the codec application may predict or detect that frames sequential in time and/or included in a particular scene or segment of 3D media content have significant redundancies and similarities across their respective voxel and/or color data. In some embodiments, the codec application may employ compression and/or encoding techniques that only encode a delta or change of the predictive frames with respect to the I-frame, and/or compression and/or encoding techniques may be employed to exploit redundancies within a particular frame. Each GOP may correspond to different time periods of the 3D media asset.

Data structure 200 may be generated in any suitable format. As an example, as shown in FIG. 2A, data structure 200 may be a color table comprising a plurality of rows and columns. For example, each row, or each column, or each other particular portion of data structure 200, e.g., a color table, may encode a single color, e.g., comprising R, G and B components specifying the color. As a non-limiting example, as shown in FIG. 2A, data structure 200 may comprise at least rows 202, 204, 206, 208, and 210 and columns 212, 214 and 216. Each of rows 202, 204, 206, 208, and 210 may represent a single color, e.g., represented by R, G, and B components, for the particular row and specified in columns 212, 214 and 216, respectively. For example, row 202 may correspond to an RGB value of {100, 209, 59}, row 204 may correspond to an RGB value of {117, 57, 61}, etc. In the example shown in FIG. 2A, the size, e.g., number of rows, of data structure 200 may depend on the selected K value, e.g., for a K value of 256, the size of data structure 200 may be 256 rows×3 columns.

Figure 2B:
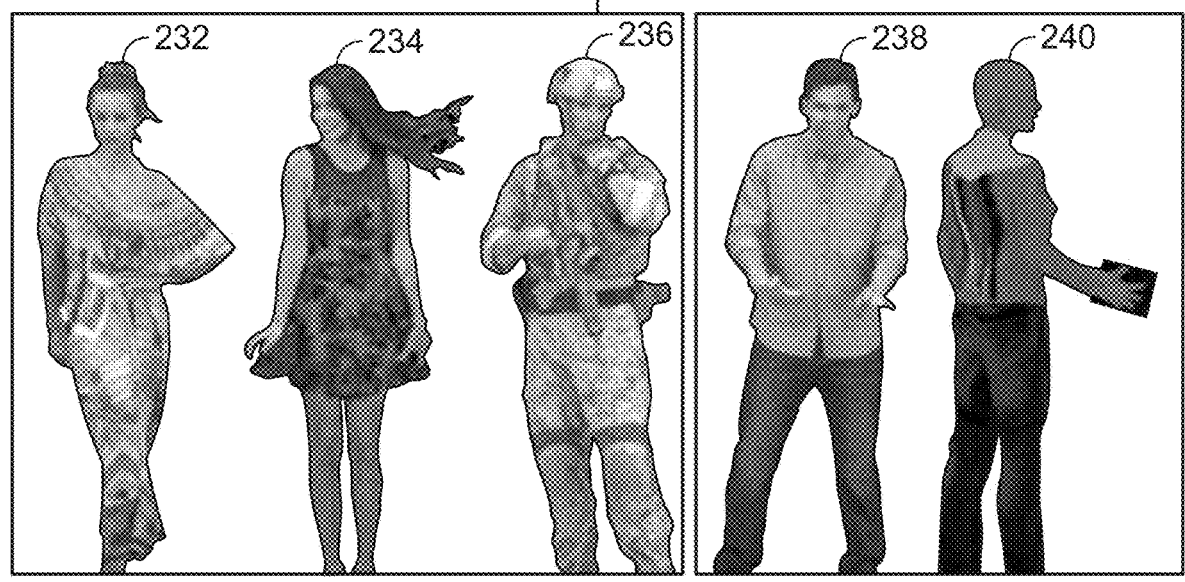
FIG. 2B shows illustrative peak signal-to-noise ratio (PSNR) values for vector quantized color attributes, and illustrative objects of 3D media content, in accordance with some embodiments of this disclosure.

FIG. 2B shows a table 220 of illustrative peak signal-to-noise ratio (PSNR) values for vector quantized color attributes, and illustrative objects of 3D media content, in accordance with some embodiments of this disclosure. Table 220 shows PSNR values, computed after vector quantization of point cloud color attributes is performed, for each of the objects or entities 232, 234, 236, 238 and 240 at K=256, 128, 64, 32 or 16, as indicated at 222, 224, 226, 228 and 230, respectively. As shown in table 220, for K=32~256, a PSNR between 32 dB to 45 dB for can be achieved using such quantization techniques. Such aspects can enable reduction of the network size of a machine learning model (e.g., machine learning model $F_\Theta$ 156 of FIG. 1 and/or machine learning model 300 of FIG. 3) used to facilitate a voxel geometry to color attributes information mapping. Using such quantization techniques, the codec application may obtain a high quality reconstruction of the one or more frames of the 3D media content, to map portions of the one or more frames (e.g., each portion of soldier 236) to, for example, one of 256 RGB triples representing various colors, such as when K=256, using data structure 200 of FIG. 2A. For example, the codec application may enable the representation of color attributes information using a limited set of information K×3 (e.g., where K is between 64 and 256) as compared to encoding 16.8 million color variations for the 24-bit color depth rendition in the absence of such quantization and use of data structure 200 of FIG. 2A. Such reduced set of colors may enable reduced use of computing and network resources in delivering encoded 3D media content to a user and in generating and employing a machine learning model for obtaining color attributes information for a portion of a frame of 3D media content based on an input voxel coordinate.

In some embodiments, the codec application may adaptively determine a particular K value (e.g., from the K values indicated at 222, 224, 226, 228 or 230 of FIG. 2B, or from any other suitable K value). In at least some circumstances, the quantization process may be lossy, and depending on a target bitrate and/or a desired quality of the 3D media content, the codec application may determine that any quality loss resulting from the quantization process may not be justified, such as in the case of a high bitrate streaming session. In some embodiments, the codec application may facilitate an optimized rate-distortion performance per target bitrate or quality level. In some embodiments, point cloud compression (PCC) data may be similar with respect to various frames in a scene, and the codec application may be configured to apply the quantization process to all frames within a particular scene and/or frames sequential in time and/or part of a particular GOP. In some embodiments, the codec application may transmit, e.g., to a client device requesting access to 3D media content, only one data structure 200 applicable to multiple frames (e.g., within a GOP or a particular scene or segment), thereby reducing the overhead and networking resources used to transmit encoded data for the 3D media content.

Figure 3:
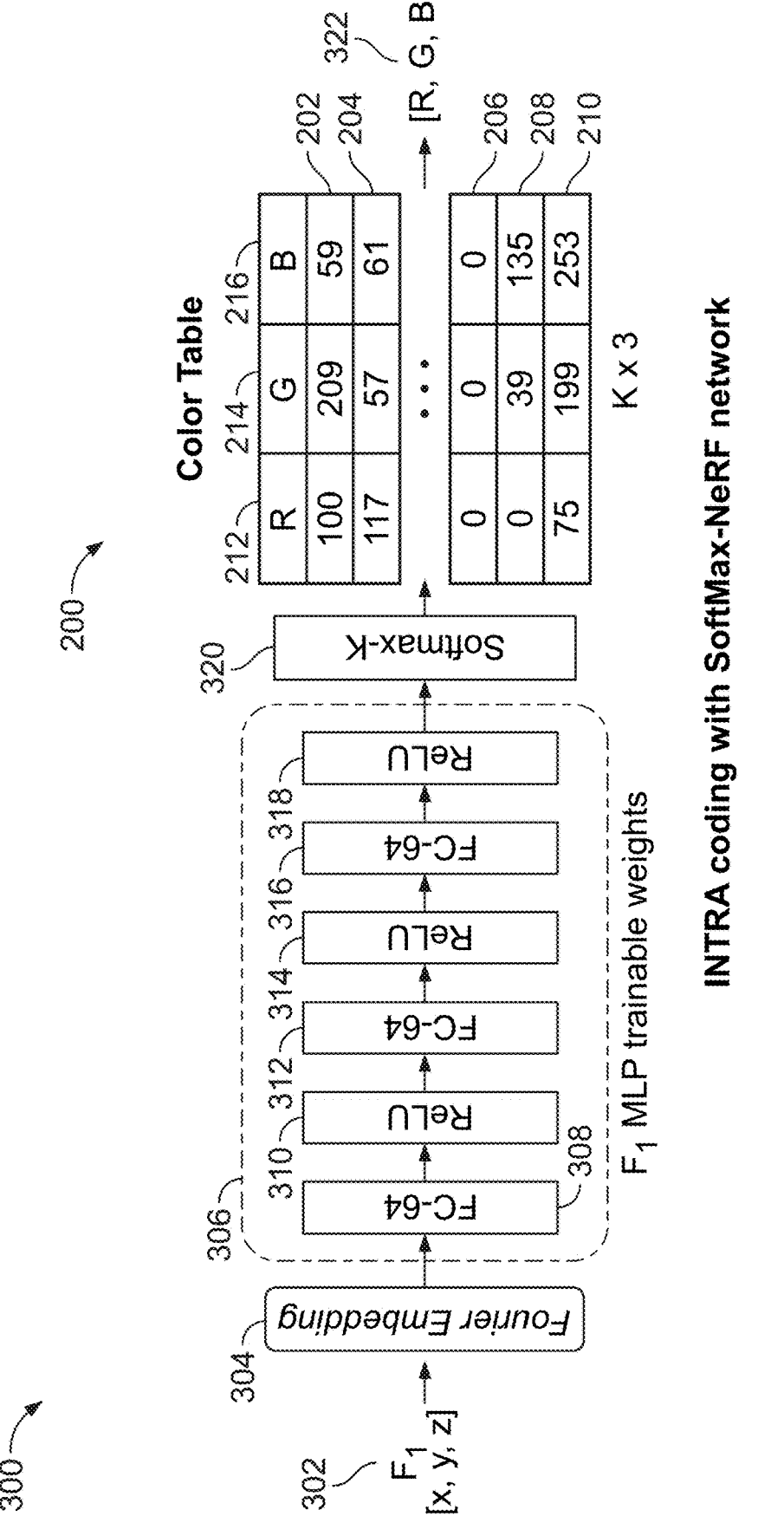
FIG. 3 shows an illustrative example of encoding 3D media content data using a machine learning model, in accordance with some embodiments of this disclosure.

FIG. 3 shows an illustrative example of encoding 3D media content data using a machine learning model, in accordance with some embodiments of this disclosure. In some embodiments, the codec application may generate one or more machine learning models to efficiently predict color attributes information for known voxel geometry (e.g., point cloud frames stored, for example, in association with a data structure comprising a list of voxels listing their coordinates). In some embodiments, the codec application may employ an encoding scheme that uses both intra-coding for certain frames, and/or inter-coding for frames that are similar to such certain frames, to achieve efficient data compression. The machine learning model(s) may correspond to a neural network, a convolutional neural network (CNN), multi-layer perceptron (MLP) artificial neural network, a recurrent neural network, or any other suitable type of machine learning model, or any other computer-implemented technique may be employed, or any combination thereof.

Each of one or more frames of 3D media content may be defined by voxel point cloud data (e.g., a set of [x, y, z] coordinates or a set of polar coordinates). Initially, color attributes information (e.g., [R, G, B] data and/or [hue, saturation, brightness] data) may also be stored for each voxel (e.g., in a table or other suitable data structure). In some embodiments, based on the color attributes information, the codec application may generate data structure 200, e.g., a color table, which may be generated by, for example, using vector quantization, as discussed in connection with FIG. 2A, and such data structure 200 may be stored in connection with the color attributes information and voxel point cloud data. The codec application may reduce memory required to store (and/or network resources required to transmit) the color attributes information by generating one more machine learning models 300. In some embodiments, each of the one or more machine learning models 300 may be trained to receive as input a coordinate of a voxel of a particular frame of the 3D media content, and to output an identifier of a particular element (e.g., a row or column or other suitable portion) of the generated data structure 200. For example, such one or more machine learning models 300 may be trained to learn a relationship between vector quantized color attributes specified in data structure 200 and voxel coordinates for one or more frames of 3D media content, e.g., by using ground truth vector quantized color attribute data. This may enable the trained model to identify which portion of data structure 200 should be output, to enable reconstruction of the color attributes for a given voxel coordinate, e.g., at a display of a client device that may be configured to receive and implement machine learning model 300.

In some embodiments, the one or more machine learning models may be neural networks implemented based on a softmax-NeRF architecture, or any other suitable architecture. Such architecture may utilize fully connected (FC) layers which are further described by Chellapilla, "High Performance Convolutional Neural Networks for Document Processing," Tenth International Workshop on Frontiers in Handwriting Recognition, Université de Rennes, Oct. 1, 2006, the contents of which is hereby incorporated by reference herein in its entirety.

For example, voxel coordinate values [x, y, z] 302 for a particular frame (e.g., frame $F_1$ of 3D media content) may be input into machine learning model 300 to acquire an identifier of a particular element in generated data structure 200. Machine learning model 402 of FIG. 4 may be similarly trained to process voxel coordinate data into an identifier of a particular element in generated data structure 200. In some embodiments, machine learning model 300 may be trained by an iterative process of adjusting weights (and/or other parameters) for each layer of machine learning model 300. For example, the codec application may input a training set of voxel coordinates into machine learning model 300, obtain an identifier of a particular element in generated data structure 200 of FIGS. 2 and 3, and use the output identifier to determine a particular color for the corresponding training voxel coordinate. Such particular color may be compared to a real color value (e.g., as defined by a full voxel table that stores voxel location and color attributes information, such as, for example, vector quantized color attributes information, and/or other color attributes information, for a particular voxel coordinate of a particular frame of 3D media content). The codec application may then adjust weights or other parameters of machine learning model 300 based on how closely the output color attributes information (e.g., determined based on the particular element of data structure 200 output by model 300) matches the real color value. The training process may be repeated until results stop improving or until a certain performance level is achieved (e.g., until 95% accuracy is achieved, or any other suitable accuracy level or other metrics are achieved). Machine learning model 402 of FIG. 4 may be similarly trained. In some embodiments, training of machine learning model 402 may be expedited by beginning the training with weights and/or other parameters already computed for machine learning model 300.

In some embodiments, model 300 may be trained to learn features and patterns with respect to input voxel coordinates and corresponding color attributes information, such as, for example, vector quantized color attributes, associated with a particular frame of 3D media content. Such learned inferences and patterns may be applied to received data once model 300 is trained. In some embodiments, model 300 is trained at an initial training stage, e.g., offline. In some embodiments, model 300 may be trained or may continue to be trained on the fly or may be adjusted on the fly for continuous improvement, based on input data and inferences or patterns drawn from the input data, and/or based on comparisons after a particular number of cycles. In some embodiments, model 300 may be content independent or content dependent, e.g., may continuously improve with respect to certain types of content.

In some embodiments, model 300 may be trained with any suitable amount of training data from any suitable number and/or types of sources. In some embodiments, machine learning model 300 may be trained by way of unsupervised learning, e.g., to recognize and learn patterns based on unlabeled data. Additionally or alternatively, machine learning model 300 may be trained by supervised training with labeled training examples to help the model converge to an acceptable error range. In some embodiments, the training image data may be suitably formatted and/or labeled (e.g., with identities of various voxel coordinates and corresponding color attributes information and/or identifiers of portions of a data structure corresponding to such information) by human annotators or otherwise labeled via a computer-implemented process. Any suitable network training patch size and batch size may be employed for training model 300. In some embodiments, random weights, e.g., used to initialize model 300, may be pre-computed at an encoding device (e.g., server 604 of FIG. 6 and/or any other suitable encoding device executing the codec application) and/or a decoding device (e.g., client device 607, 608 or 610 of FIG. 6 and/or any other suitable decoding device executing the codec application). Such features may provide a savings with respect to network and/or computing resources which otherwise may have been utilized to transmit encoded data associated with such weights.

In some embodiments, the codec application may perform any suitable type of preprocessing of input data (e.g., during training and/or during use of the trained model), in conjunction with the encoding and mapping of voxel geometry to color attributes information, e.g., specified via an identifier of data structure 200, using machine learning model 300. For example, in some embodiments, the codec application may employ a random Fourier embedding layer 304. Voxel coordinate values [x, y, z] 302, which may correspond to an intra-coded frame, may be input to Fourier embedding layer 304 to undergo a Fourier embedding process, to map each 3D point to a 2×m dimensional vector. For example, voxel coordinate values [x, y, z] 302 may be normalized to [0, 1], and the codec application may perform computations based on the equation (1) below, where the randomized parameters $[a_1 \ldots, a_m]$ are scalars, and $[B_1, \ldots, B_m]$ are vectors of three dimensions. Such Fourier embedding technique may enable increasing the dimensionality of a feature space of input coordinates 302 to model 300, e.g., from 3 to 2×m, where m may represent the number of rows in a matrix, and may contribute to a reduction in the number of layers in model 300 and an improved overall performance. In some embodiments, any suitable value for m may be specified, which impacts a number of dimensions of a vector (or a matrix or other suitable numerical representation) to be input to layers 306 of machine learning model 300. As a non-limiting example, the codec application may specify that m=12, such that the input to layers 306 of machine learning model 300 is a vector of 24 dimensions.

$$\gamma([x, y, z]) = [a_1 \cos(2\pi B_1[x, y, z]^T, \tag{1}$$

$$a_1 \sin(2\pi B_1[x, y, z]^T, ..., a_m \cos(2\pi B_m[x, y, z]^T, a_m \sin(2\pi B_m[x, y, z]^T)$$

As shown in FIG. 3, voxel coordinate values [x, y, z] 302, optionally having been input to Fourier embedding layer 304 and/or undergone any other suitable preprocessing, may be input to layers 306 of machine learning model 300. The codec application may configure machine learning model 300 to comprise any suitable number and/or types of inputs and outputs and any suitable number and types of layers (e.g., one or more input layers, one or more output layers, and one or more hidden layers). For example, layers 306 of model 300 may comprise, for example, layer 308, layer 310, layer 312, layer 314, layer 316, and layer 318. In some embodiments, machine learning model 300 may include softmax layer 320. In some embodiments, layers 308, 312 and 316 may be fully connected layers, and layers 310, 314 and 318 may be rectified linear unit (ReLU) layers, or any other suitable layer or unit associated with any suitable activation function.

In some embodiments, layers 310, 314 and 318 may respectively correspond to layers 308, 312 and 316, and may be configured to activate or deactivate certain neurons or nodes of model 300 based on values fed to the particular ReLU layer. For example, a particular ReLU layer may output a value input to such ReLU layer if the input value is positive, or otherwise may output zero. In some embodiments, softmax layer 320 may be used as the final layer of machine learning model 300. Softmax layer 320 may be used to obtain a normalized probability distribution. For example, softmax layer 320 may be configured to output one or more probabilities that candidate elements of data structure 200 correspond to an input voxel coordinate, such that each probability is between 0 and 1 and the probabilities sum to 1. In some embodiments, the codec application may configure a size of softmax layer 320 based on the K value associated with data structure 200, where the size of data structure 200 (e.g., K×3 color values) may be based on such K value. In some embodiments, the number of probabilities to be output by softmax layer 320 may match the K value associated with the size of data structure 200.

In some embodiments, layers 308, 312 and 316 may comprise 64 neurons or nodes, or any suitable number of neurons or nodes per layer, and may comprise any suitable number of weights or other parameters for each neuron and/or any other suitable neuron or node properties. In some embodiments, each layer may be fully connected to the next layer. In some embodiments, each layer may comprise one or more nodes, which may be respectively associated with learned parameters (e.g., weights and/or biases), and/or connections between nodes may represent parameters (e.g., weights and/or biases) learned and adjusted during training (e.g., using backpropagation techniques, and/or any other suitable techniques). In some embodiments, the nature of the connections may enable or inhibit certain nodes of the network, e.g., using ReLU layers 310, 314 and/or 318. In some embodiments, the codec application may be configured to receive (e.g., prior to training) user specification of (or may automatically select) hyperparameters (e.g., a number of layers and/or nodes or neurons in model 300). The codec application may automatically set or receive manual selection of a learning rate, e.g., indicating how quickly parameters should be adjusted. In some embodiments, weights or other parameters of machine learning model 300 may be represented as a table with each column representing weights of one of the layers of the machine learning model 300, as discussed in more detail in U.S. application Ser. No. 17/829,734 filed Jun. 1, 2022 in the name of ROVI GUIDES, INC., the contents of which is hereby incorporated by reference herein in its entirety.

In some embodiments, the codec application may enable an encoding device (e.g., server 604 of FIG. 6 and/or any other suitable encoding device executing the codec application) to transmit encoded data to a decoding device (e.g., client device 607, 608 or 610 of FIG. 6 and/or any other suitable decoding device executing the codec application). For example, the decoding device may have requested access to 3D media content or portions thereof, e.g., based on input received at the decoding device, and/or by requesting portions of the 3D media content using a manifest file received from server 604 and/or content source 602 of FIG. 6. The encoded data transmitted to the decoding device may comprise an indication of the coordinates of the voxel of a particular frame associated with the 3D media content, data structure 200 (e.g., a color table) associated with the particular frame, stored weights for layers of machine learning model 300 having been learned by way of training model 300, and/or any other suitable data.

In some embodiments, the encoded data may be generated based on, and/or comprise indications of, coordinates of voxels for multiple frames of the 3D media content, may specify data structure 200, stored weights for layers of machine learning model 300 having been learned by way of training model 300, and/or any other suitable data. In some embodiments, the encoded data may not be transmitted until all frames of a particular media content item, or a predefined portion thereof, have been encoded. Alternatively, in some embodiments, portions of the 3D media content may be transmitted as such portions are encoded, e.g., in connection with live content. For example, such multiple frames may correspond to a GOP or a group of frames sequential in time or otherwise related frames or any other suitable grouping of frames. In some embodiments, a single data structure 200 may be applicable to, and transmitted in association with, such multiple frames, thereby conserving computing and/or networking resources that may otherwise be used to transmit a respective data structure 200 for each frame. In some embodiments, the codec application may determine that data structure 200 differs slightly with respect to such multiple frames. In such an instance, the codec application may transmit to the client device an indication of a delta or residual between data structure 200 for a particular frame or frames and a data structure for subsequent frames, to enable the client device to generate a color table for such subsequent frames(s), which may similarly conserve computing and/or networking resources. In some embodiments, the codec application may, for one or more frames subsequent to the first frame, cause vector quantization to be re-performed for such frame(s), to generate an updated color table that accommodates the color attributes of the subsequent frame(s).

In some embodiments, depending on a desired reconstruction PSNR, e.g., indicated by a requesting device and/or otherwise suitable for a particular portion of 3D media content, the codec application may determine a suitable size (e.g., a value of K) for data structure 200 of FIG. 3. In some embodiments, the codec application may cause the encoding device to transmit an indication to the decoding device that softmax layer 320 should correspond to the size of such data structure 200. For example, the codec application may configure the number of probabilities to be output by softmax layer 320 based on the K value associated with data structure 200. In some embodiments, as the value of K that is selected by the codec application in association with the quantization operation decreases, the number of weights and/or layers to be trained in the machine learning model may decrease.

The decoding device (e.g., client device 607, 608 or 610 of FIG. 6 and/or any other suitable device executing the codec application) may recover the first frame (e.g., to display the 3D media content) by reconstructing model 300 based at least in part on weights and/or other parameters for model 300 received from, e.g., server 604, as part of the encoded data. The decoding device may determine color attributes information for a particular frame, e.g., frame $F_1$ of a segment of requested 3D media content, by inputting a coordinate of the voxel (e.g., having been received from the encoding device as part of the encoded data) of the particular frame into the trained machine learning model 300. Such trained machine learning model 300 may be configured to output an identifier of a particular row in the generated data structure 200, e.g., having been received from the encoding device as part of the encoded data, which may be received as a bitstream. The decoding device may be configured to use the received data structure and the output identifier of data structure 200 to determine the color attributes information for the particular frame, and render the coordinates of such frame of the 3D media content based on the determined color attributes information associated with the output identifier.

The codec application may be configured to determine the color for a particular coordinate of a voxel of a frame of 3D media content based on an identifier (e.g., of a particular row of data structure 200) output by trained model 300. For example, the codec application may determine that of one or more probabilities output by softmax layer 320 of trained model 300, row 204 has the highest probability of corresponding to an input voxel coordinate. The codec application may retrieve the R, G and B components for row 204 of data structure 200, and the codec application may generate color attributes 322 for the input voxel coordinate based on the single color corresponding to the retrieved R, G and B components for row 204. Such process may be repeated for any suitable number of voxel coordinates and for any suitable number of frames of the 3D media content.

The example of FIG. 3 may be applicable to intra-frame coding. For example, a particular frame (e.g., frame $F_1$) may be the first frame where a certain object (e.g., soldier 236 of FIG. 2B) appears, and may be thus chosen to be a frame that benefits from intra-coding. In some embodiments, inter-coding of frames may leverage the features discussed in FIG. 3, as discussed in more detail in connection with FIG. 4.

Figure 4:
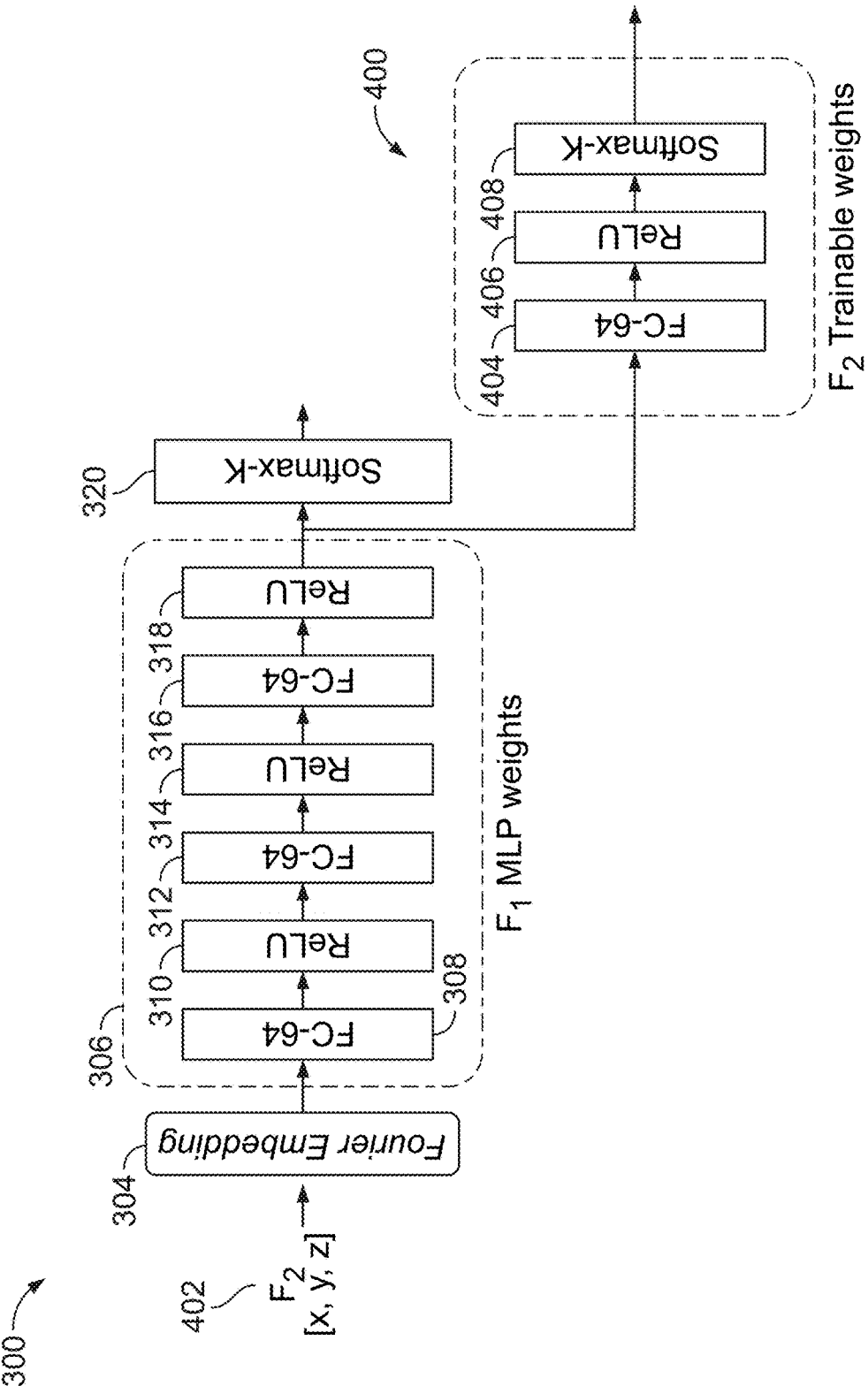
FIG. 4 shows an illustrative example of encoding 3D media content data using a machine learning model, in accordance with some embodiments of this disclosure.

FIG. 4 shows an illustrative example of encoding 3D media content data using a machine learning model, in accordance with some embodiments of this disclosure. As shown in FIG. 4, additional layer(s) 400 may be added to the layers of model 300 shown in FIG. 3, e.g., to layers 306, 304, and 320, or any combination thereof, to enable coding of frame $F_2$, such as, for example, by way of inter-coding. For example, the codec application may determine that frame $F_2$ (and/or any other suitable number of frames) is similar to frame $F_1$, and for this reason the codec application may perform predictive coding for theses frames to achieve additional interframe compression. For example, the codec application may leverage the observation that successive point cloud frames in a temporal sequence tend to be quite redundant in their color representation, to achieve inter-coding gains.

For example, given that weights for layers 306 have been learned during training for first frame $F_1$. encoding of second frame $F_2$ can be achieved by re-using the frame $F_1$ weights for layers 306 and adding additional layer(s) 400 to train the final full connection (e.g., including layers 306, 304, and 320, and layers 404, 406 and 408, or any combination thereof). The codec application may input voxel coordinate [x, y, z] for second frame $F_2$ to model 300 including the additional layers(s) 400, where model 300 may re-use the reference frame $F_1$'s trainable weights for feature embedding learned in connection with frame $F_1$, which may be a reference frame. The codec application may learn weights for such additional layers(s) 400 by performing training of such layers based at least in part on ground truth data for vector quantized attributes with respect to a particular voxel coordinate input, e.g., for frame $F_2$. That is, model 300 may be updated with additional layer(s) 400, by adjusting the weights associated with such additional layer(s) based on a comparison between output of the updated machine learning model and color attributes information of the second frame $F_2$, and such updating may be repeated until a certain performance level is achieved. In some embodiments, such aspects may enable only, e.g., weights of layer 404 and softmax layer 408 to be coded for the inter-coding of frame $F_2$ and transmitted to the decoding device, since the weights for layers 306 and/or 320 may have already been transmitted to the decoding device, which contributes to a higher coding efficiency. In some embodiments, the codec application may train additional layer(s) 400 in a similar manner that layers 306 were trained, but with a training dataset selected from voxels of frame $F_2$. Such aspects may simplify the training of additional layer(s) 400.

In some embodiments, when coding another frame (e.g., frame $F_3$, not shown) in the sequence (e.g., including frames $F_1$ and $F_2$), the codec application may be configured to re-use the trainable weights learned in connection with inputting the coordinates of frame $F_1$ to model 300 and learned in connection with inputting the coordinates frame $F_2$ to the updated model 300 (e.g., including additional layer(s) 400). That is, for frame $F_2$ and any subsequent frame(s) in the sequence, the codec application may include in encoded data for such frame(s) indications of weights for only the additional layers used to learn the vector quantized color attributes and/or color table index attributes associated with frame $F_2$ or such subsequent frame(s). Such features may enable the codec application to provide additive training layers for inter-coding of successive frames. In some embodiments, such encoded data, e.g., to be transmitted to a decoding device, may include an indication of a common data structure 200, e.g., a common color table, to be used with a plurality of frames. For example, such plurality of frames may be included in a GOP or otherwise be related or be in sequence, such as, for example, including 8-15 frames or any other suitable number of frames having consistent object colors and/or other consistent features. Such aspects may enable the codec application to minimize the amount of encoded data to be transmitted to a decoding device in connection with such plurality of frames. In some embodiments, such aspects may result in a smaller number of network weights to be used in connection with the transmission of such stored weights to a decoding device.

FIGS. 5-6 depict illustrative devices, systems, servers, and related hardware for encoding and/or decoding of 3D media content. FIG. 5 shows generalized embodiments of illustrative user equipment devices 500 and 501, which may correspond to, e.g., the above-described decoding devices. In some embodiments, user equipment device 500 may be a smartphone device, a tablet, a virtual reality or augmented reality device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, display 512 may be a 3D display, such as, for example, a tensor display, a light field display, a volumetric display, a multi-layer display, an LCD display or any other suitable type of display, or any combination thereof. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 5 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the codec application stored in memory (e.g., storage 508). Specifically, control circuitry 504 may be instructed by the codec application to perform the functions discussed above and below. In some implementations, processing or actions performed by control circuitry 504 may be based on instructions received from the codec application.

In client/server-based embodiments, control circuitry 504 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the codec application may be a client/server application where only the client application resides on device 500 (e.g., device 104), and a server application resides on an external server (e.g., server 604 and/or server 616). For example, the codec application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 604 and/or edge server 616), referred to as "the cloud." Device 600 may be a cloud client that relies on the cloud computing capabilities from server 604 to receive and process encoded data for 3D media content. When executed by control circuitry of server 604 or 616, the codec application may instruct control 611 or 618 circuitry to perform processing tasks for the client device and facilitate the encoding/decoding.

Control circuitry 504 may include communications circuitry suitable for communicating with a server, edge computing systems and devices, a table or database server, or other networks or servers. The instructions for carrying out the above-mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as codec application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The codec application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/ server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the codec application may be downloaded and interpreted or otherwise run by an interpreter or virtual machine (run by control circuitry 504). In some embodiments, the codec application may be encoded in the ETV Binary Interchange Format (EBIF), received by control circuitry 504 as part of a suitable feed, and interpreted by a user agent running on control circuitry 504. For example, the codec application may be an EBIF application. In some embodiments, the codec application may be defined by a series of JAVA-based files that are received and run by a local virtual machine or other suitable middleware executed by control circuitry 504. In some of such embodiments (e.g., those employing MPEG-2 or other digital media encoding schemes), codec application may be, for example, encoded and transmitted in an MPEG-2 object carousel with the MPEG audio and video packets of a program.

FIG. 6 is a diagram of an illustrative system 600 for encoding and/or decoding of 3D media content, in accordance with some embodiments of this disclosure. System 600 may comprise user equipment devices 607, 608, and/or 610 and/or any other suitable number and types of user equipment, capable of transmitting data by way of communication network 609. Communication network 609 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 609) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 609.

System 600 may comprise media content source 602, one or more servers 604, and one or more edge servers 616 (e.g., included as part of an edge computing system). In some embodiments, the codec application may be executed at one or more of control circuitry 611 of server 604 (and/or control circuitry of user equipment devices 607, 608, 610 and/or control circuitry 618 of edge servers 616). In some embodiments, data structure 200 of FIG. 2A, may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide encoding/decoding data, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing server 616 may comprise control circuitry 618, I/O path 620 and storage 622, which may be implemented in a similar manner as control circuitry 611, I/O path 612 and storage 624, respectively of server 604. Edge server 616 may be configured to be in communication with one or more of user equipment devices 607, 608, 610 and video server 604 over communication network 609, and may be configured to perform processing tasks (e.g., encoding/decoding) in connection with ongoing processing of video data. In some embodiments, a plurality of edge servers 616 may be strategically located at various geographic locations, and may be mobile edge servers configured to provide processing support for mobile devices at various geographical regions.

Media content source 602, server 604 or edge server 616, or any combination thereof, may include an encoder. Such encoder may comprise any suitable combination of hardware and/or software configured to process data to reduce storage space required to store the data and/or bandwidth required to transmit the image data, while minimizing the impact of the encoding on the quality of the media content being encoded. In some embodiments, the data to be compressed may comprise a raw, uncompressed 3D media content, or 3D media content in any other suitable format. In some embodiments, each of user equipment devices 607, 608 and/or 610 may receive encoded or encoded data locally or over a communication network (e.g., communication network 609 of FIG. 6) and may comprise one or more decoders. Such decoder may comprise any suitable combination of hardware and/or software configured to convert data in a coded form to a form that is usable as video signals and/or audio signals or any other suitable type of data signal, or any combination thereof. User equipment devices 607, 608 and/or 610 may be provided with encoded data, and may be configured to implement one or more machine learning models (e.g., model 300 of FIG. 3) to obtain an identifier of an element in a data structure (e.g., data structure 200), and render a color for a particular voxel based on such identified element. In some embodiments, at least a portion of decoding may be performed remote from user equipment devices 607, 608 and/or 610.

Figure 7:
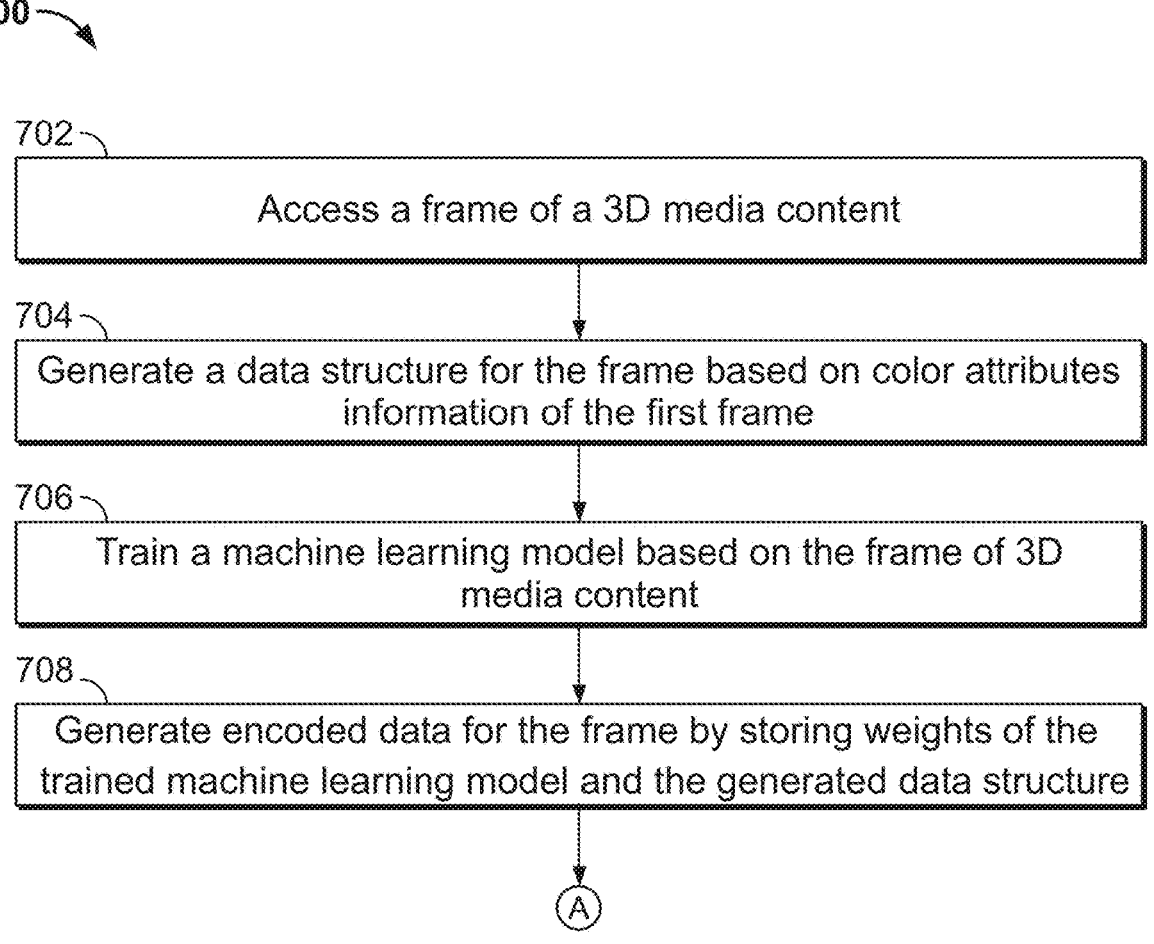
FIG. 7 is a flowchart of a detailed illustrative process for encoding 3D media content data using a machine learning model, in accordance with some embodiments of this disclosure.

FIG. 7 is a flowchart of a detailed illustrative process 700 for encoding 3D media content data using a machine learning model, in accordance with some embodiments of this disclosure. In various embodiments, the individual steps of process 700 may be implemented by one or more components of the devices and systems of FIGS. 1-6. Although the present disclosure may describe certain steps of process 700 (and of other processes described herein) as being implemented by certain components of the devices and systems of FIGS. 1-6, this is for purposes of illustration only, and it should be understood that other components of the devices and systems of FIGS. 1-6 may implement those steps instead.

At step 702, control circuitry (e.g., control circuitry 611, control circuitry 618, or control circuitry of any of devices 607, 608, or 610 and/or any other suitable control circuitry) may be configured to execute the codec application to access a frame (e.g., a first frame 102 of FIG. 1A, or a first frame $F_1$ of FIG. 3) of 3D media content (e.g., content 100 of FIG. 1A). For example, the control circuitry may access voxel geometry information (e.g., input coordinates [x, y, z] 152 of FIG. 1A and view angle [theta, phi] 154 of FIG. 1A) for such frame and/or color attributes information (e.g., 24-bit RGB color depth information for each voxel of the frame) for such frame.

In some embodiments, the frame of the 3D media content, or the entire 3D media content or any suitable portion thereof, may accessed in an uncompressed and/or raw form, and may be ingested to, e.g., server 604 of FIG. 6. For example, the control circuitry may access the 3D media content over a network (e.g., communication network 609 of FIG. 6 and/or any other suitable network) or any suitable wireless or wired communication path from any suitable source (e.g., media content source 602 of FIG. 6). In some embodiments, the control circuitry may generate the media content, and/or retrieve the image data from memory (e.g., memory or storage 614 or database 605, or any other suitable data store, or any combination thereof) and/or receive the image data over any suitable data interface.

The frame accessed by the control circuitry may be any frame in the 3D media content. For example, the control circuitry may select a frame at a beginning of a scene or a frame where the geometry information changed significantly (e.g., over 70% change from the last frame or any other suitable threshold). The voxel geometry information may comprise coordinate values for voxels of the frame of the 3D media content and their associated colors. For example, this step may be performed as part of encoding of 3D media content for efficient storage (e.g., in storage 614 and/or 622) or for transmission over a network (e.g., network 609). In some embodiments, the frame may be intra-coded by way of process 700.

At step 704, the control circuitry may generate a data structure for the frame based on color attributes information of the frame. The control circuitry may apply any suitable quantization technique, e.g., vector quantization, to generate data structure 200 of FIG. 3, e.g., a color table. For example, the control circuitry may utilize such technique(s) to selectively reduce the number of colors (e.g., from the roughly 16.78 million possible variations associated with the 24-bit color depth rendition) used in the one or more frames to represent an object or entity or other portion therein. In some embodiments, applying the vector quantization comprises applying K-means clustering to the color attributes information of the frame.

As an example, the codec application may reduce a 24-bit color depth rendition of the one or more frames (e.g., depicting a 3D model of a soldier 236 and/or a 3D model of a person 232, 234, 238 and/or 240 shown in FIG. 2B) to 8-bit color depth indicated at 222 (e.g., 256 possible RGB color values), 7-bit color depth indicated at 224 (e.g., 128 possible RGB color values), 6-bit color depth indicated at 226 (e.g., 64 possible RGB color values), a 5-bit color depth indicated at 228 (e.g., 32 possible RGB color values), a 4-bit color depth indicated at 230 (e.g., 16 possible RGB color values) or any other suitable color depth or any combination thereof. For example, step 704 may be performed as part of encoding of 3D media content for efficient storage (e.g., in storage 614 and/or 622) or for transmission over a network (e.g., network 609). Each row, or each column, or each other particular portion of data structure 200, e.g., a color table, may encode a single color, e.g., comprising R, G and B components specifying the color. As a non-limiting example, as shown in FIG. 3, data structure 200, may comprise rows 202, 204, 206, 208, and 210 and columns 212, 214 and 216. Each of rows 202, 204, 206, 208, and 210 may represent a single color, e.g., represented by R, G, and B components, for the particular row and specified in columns 212, 214 and 216, respectively. As shown in FIG. 3, the size, e.g., number of rows, of data structure 200 may depend on the selected K value indicated in FIG. 2, e.g., for a K value of 256, the size of data structure 200 may be 256 rows×3 columns.

At step 706, the control circuitry may train a machine learning model (e.g., machine learning model 300, which may be stored at, for example, storage 614 and/or 622, in association with its parameters and/or training data). For example, the training step 706 may be performed during encoding of the 3D media content into a format suitable for storage or transmission. In some embodiments, machine learning model 300 may correspond to a neural network, a convolutional neural network (CNN), multi-layer perceptron (MLP) artificial neural network, a recurrent neural network, or any other suitable type of machine learning model, or any other computer-implemented technique may be employed, or any combination thereof.

For example, the machine learning model may be trained to accept as input coordinates of a voxel and to output an identifier of a particular element (e.g., a row or column or other suitable portion) in the generated data structure. For example, the coordinate input can be provided as [x, y, z] Cartesian coordinates, as polar coordinates, or in any other suitable fashion. Color attributes information may be outputted in any suitable fashion, e.g., as RGB values, CMYK values, hex color values, HSL values, or using any other suitable color encoding or any combination thereof. As shown in the example of FIG. 3, model 300 may be trained to learn a relationship between vector quantized color attributes specified in data structure 200 and voxel coordinates for a frame(s) of 3D media content, e.g., by using ground truth vector quantized color attribute data. The training of the machine learning model by the control circuitry may cause the model to learn weights and/or any other suitable parameters for a plurality of layers of the machine learning model. The training may include computing a result based on input values and current weight values, comparison of the computed results to the actual results (e.g., ground truth values) via a loss function, and adjustment of the weight values through backpropagation of error computed through the loss function. Forward and backward passes may be repeated (e.g., for same or different inputs) until certain level of performance is achieved (e.g., 95% accuracy or any other suitable threshold or metrics). Any other suitable type of training may be used. The weights may be stored at, for example, storage 614 of server 604 of FIG. 6, and/or any other suitable data store.

At step 708, the control circuitry may generate encoded data for the frame accessed at 702. The encoded data may be generated based at least in part on, and/or comprise indications of, coordinates of the voxel of a particular frame associated with the 3D media content, data structure 200 (e.g., a color table) associated with the particular frame, weights for layers of the trained machine learning model 300 having been learned by way of training model 300, and/or any other suitable data. In some embodiments, processing may proceed from step 708 of FIG. 7 to step 802 of FIG. 8 for generating encoded data for subsequent frame(s).

Figure 8:
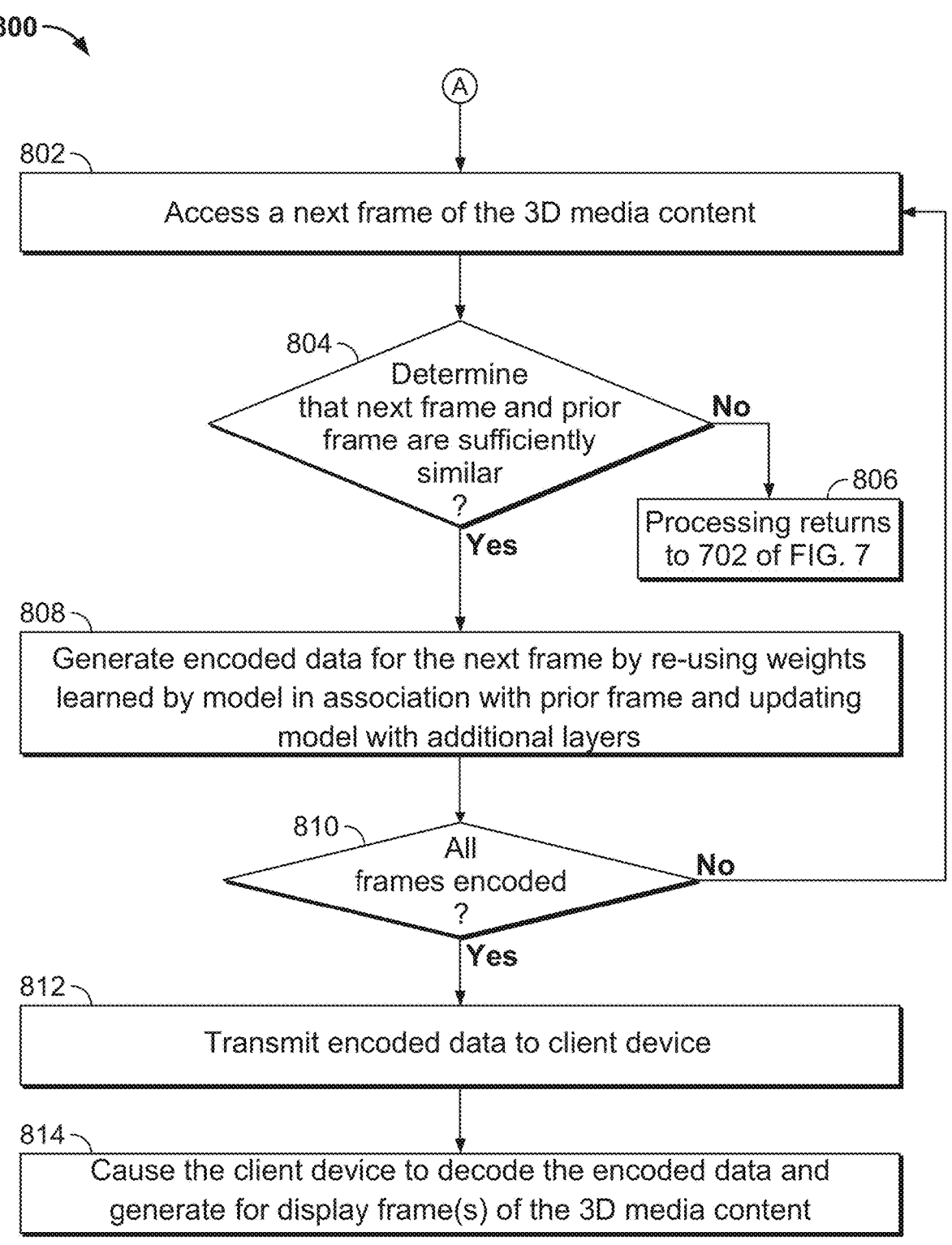
FIG. 8 is a flowchart of a detailed illustrative process for encoding 3D media content data using a machine learning model, in accordance with some embodiments of this disclosure.

FIG. 8 is another flowchart of a detailed illustrative process for encoding 3D media content data using a machine learning model, in accordance with some embodiments of this disclosure. In various embodiments, the individual steps of process 800 may be implemented by one or more components of the devices and systems of FIGS. 1-6. Although the present disclosure may describe certain steps of process 800 (and of other processes described herein) as being implemented by certain components of the devices and systems of FIGS. 1-6, this is for purposes of illustration only, and it should be understood that other components of the devices and systems of FIGS. 1-6 may implement those steps instead. In some embodiments, process 800 may be performed to encode another frame (referred to as a second frame) of the 3D media content after an initial frame (referred to as first frame). It should be noted that "first" and "second" frame are labels only and may refer to any two frames from 3D media content.

At step 802, control circuitry (e.g., control circuitry 611, control circuitry 618, or control circuitry of any of devices 607, 608, or 610 and/or any other suitable control circuitry) may be configured to execute the codec application stored in memory to access a next frame (e.g., second frame $F_2$ of FIG. 4) of the 3D media content.

At step 804, the control circuitry may determine whether such next frame (e.g., second frame $F_2$ of FIG. 4) accessed at 802 and the prior frame (e.g., first frame $F_1$ of FIG. 4), are sufficiently similar. For example, the control circuitry may determine whether characteristics of such next frame (and/or other subsequent frames) have some differences from, but generally are highly correlated with, the previous frame, e.g., the frame accessed at 702 of FIG. 7. In some embodiments, the codec application may predict or detect that frames sequential in time and/or included in a particular scene or segment of 3D media content have significant redundancies and similarities across their respective voxel and/or color data. If the codec application determines that the frame accessed at 802 is not sufficiently similar (e.g., above a threshold value of similarity, or using any other suitable metrics), processing may return to 702, and encoded data for the frame accessed at 802 may be generated using process 700. For example, a "No" determination at 804 may indicate that the frame accessed at 802 should be intra-coded, e.g., encoding a frame one-by-one, and thus at 806, processing may return to 802 after such intra-coding is performed (e.g., as described in FIG. 7), to determine how the next frame should be encoded. On the other hand, if the control circuitry determines at 804 that the frame accessed at 802 and the frame accessed at 702 are sufficiently similar, processing may proceed to 808.

In some embodiments, inter-coding for the frame accessed at 802 may not be based on the prior frame accessed at 702, and may instead be based on any other frame that occurs before or after the frame accessed at 802 in the 3D media content. For example, the codec application may select a frame for inter-coding by finding the most similar frame that was already intra-coded. In some embodiments, the codec application may decide to create a new intra-coded frame at certain time intervals or based on analysis of changes between frames, e.g., when 3D media content is determined by the codec application to be sufficiently different from existing coded frames. The frames between the intra-coded frame may be coded by the control circuitry using process 800 based on one or more of the intra-coded frames as a reference frame. The reference frames may not necessarily be selected in order, and may be any of the intra-coded frame frames (e.g., an intra-coded frame that is determined to provide the most memory and/or bandwidth savings). For example, when coding a predictively coded frame, process 800 may be repeated several times for several candidate reference frames and only the most compact results (result with smallest set of differences) may then be stored and utilized.

At step 808, the control circuitry, having determined that the frames accessed at 702 and 802 are similar and/or sequential and/or are part of or should be included as part of a GOP, may generate encoded data for the frame accessed at 802. In some embodiments, the control circuitry may generate a GOP comprising the first frame and the second frame, and/or any other suitable frame(s), e.g., based on the determination ("Yes") at 804. In some embodiments, the control circuitry may generate encoded data for the frame accessed at 802 by re-using weights learned by the model in association with the prior frame and updating the model with additional layers. For example, the weights for layers of the machine learning model (e.g., model 300 of FIG. 3) may have been learned during training (e.g., at 706 of FIG. 7) in association with the frame accessed at 702, and encoding of the frame accessed at 802 may leverage such already-learned weights. As shown in the example of FIG. 4, encoding of the frame accessed at 802 (e.g., frame $F_2$) can be achieved by re-using the frame $F_1$ weights for layers 306 and adding additional layer(s) 400 to train the final full connection (e.g., including layers 306, 304, and 320, and layers 404, 406 and 408, or any combination thereof). The codec application may input voxel coordinates [x, y, z] for second frame $F_2$ to model 300 including the additional layers(s) 400, where model 300 may re-use the reference frame F1's trainable weights for feature embedding learned in connection with frame $F_1$, which may be a reference frame, thereby achieving interframe coding efficiency.

The codec application may learn weights for such additional layers(s) 400 by performing training of such layers based at least in part on ground truth data for vector quantized attributes with respect to a particular voxel coordinate input, e.g., for frame $F_2$. That is, model 300 may be updated with additional layer(s) 400, by adjusting the weights associated with such additional layer(s) based on a comparison between output of the updated machine learning model and color attributes information of the second frame $F_2$, and such updating may be repeated until a certain performance level is achieved. In some embodiments, such aspects may enable only, e.g., weights of layer 404 and softmax layer 408 to be coded for the inter-coding of frame $F_2$ and transmitted to the decoding device, since the weights for layers 306 and/or 320 may have already been transmitted to the decoding device, which contributes to a higher coding efficiency. In some embodiments, the codec application may train additional layer(s) 400 in a similar manner that layers 306 were trained, but with a training dataset selected from voxels of frame $F_2$. Such aspects may simplify the training of additional layer(s) 400.

In some embodiments, the control circuitry may generate, for inclusion in the encoded data, a data structure (e.g., a color table 200 of FIG. 3) by performing vector quantization of color attributes associated with one or more voxels of one or more frames that are optimized for the sequence of frames. For example, the data structure may be transmitted in association with the GOP or sequence of correlated frames, and the same data structure may be usable for each of the frames. In some embodiments, the codec application may determine that data structure 200 differs slightly with respect to the multiple frames. In such an instance, the codec application may transmit, e.g., as part of encoded data to the client device, an indication of a delta or residual between data structure 200 for a particular frame or frames and a data structure for subsequent frames. In some embodiments, vector quantization may be re-performed for certain frames, e.g., to generate a different data structure or color table for certain frames.

At step 810, the control circuitry may determine whether all frames of the 3D media asset have been encoded. For example, step 810 may be employed in connection with VOD content, where it may be desirable to encode the entirety of the 3D media content prior to transmitting such content. In some embodiments, if all frames have been encoded, processing may proceed to 812; on the other hand, if not all frames have been encoded, processing may return to 802 (or 702). In some embodiments, step 810 is optional. In some embodiments, such as, for example, if the 3D media content is live content, portions of the 3D media asset comprising one or more frames (e.g., a segment of the 3D media asset) may be transmitted to the decoding device as encoded data for such portion is generated, e.g., to provide segments of content in real-time, and thus step 810 may be omitted.

At step 812, the control circuitry (e.g., 611 of server 604 of FIG. 6) may transmit (e.g., over communication network 609 of FIG. 6) the encoded data for the next frame (and/or any suitable number of subsequent or prior frames, e.g., the frame accessed at 702 of FIG. 7) to the client device (e.g., client device 607, 608 or 610 of FIG. 6). In some embodiments, the encoded data may correspond to an entire 3D media asset, or a portion thereof. In some embodiments, the encoded data may comprise, for each encoded frame, indications of coordinates of a voxel associated with a particular frame of the 3D media content, the generated data structure (e.g., a color table corresponding to data structure 200 of FIG. 3, which may be applicable to multiple frames and thus only transmitted once), stored weights for layers of machine learning model 300 having been learned by way of training model 300, and/or any other suitable data. For example, step 812 may be performed as part of encoding of 3D media content for efficient storage (e.g., in storage 614 and/or 622) or for transmission over a network (e.g., network 609). In some embodiments, the encoded data may be transmitted in response to receiving a request from the client device to access the 3D media content or one or more portions thereof.

In some embodiments, for the frame accessed at 802 and/or some subsequent frame(s) in the sequence, the codec application may include in encoded data for such frame(s) indications of weights for only the additional layers used to learn the vector quantized color attributes and/or color table index attributes associated with such frame(s). These aspects may enable the codec application to provide additive training layers for inter-coding of successive frames. In some embodiments, such encoded data, e.g., to be transmitted to a decoding device, may include an indication of a common data structure 200, e.g., a common color table, to be used with a plurality of frames. For example, such plurality of frames may be included in a GOP or otherwise be related or be in sequence, such as, for example, including 8-15 frames or any other suitable number of frames having consistent object colors and/or other consistent features. Such aspects may enable the codec application to minimize the amount of encoded data to be transmitted to a decoding device in connection with such plurality of frames. In some embodiments, such aspects may result in a smaller number of network weights to be used in connection with the transmission of such stored weights to a decoding device.

At step 814, the control circuitry may cause the client device to decode the encoded data and generate for display the one or more frames of the 3D media content. The codec application, e.g., running on the client device, may be configured to recover the first frame and subsequent frames (e.g., to display the 3D media content) by reconstructing model 300 based at least in part on the weights and/or other parameters for model 300 received from, e.g., server 604, as part of the encoded data. Such generated or reconstructed model 300, e.g., a neural network, may be used to construct the first frame, and subsequent frames, by recovering color information for each known voxel of the frames. In some embodiments, random weights, e.g., used to initialize model 300, may be pre-computed at an encoding device (e.g., server 604 of FIG. 6 and/or any other suitable encoding device executing the codec application) and/or a decoding device (e.g., client device 607, 608 or 610 of FIG. 6 and/or any other suitable decoding device executing the codec application). In some embodiments, the client device is provided with information regarding the structures of model 300 and/or any other suitable characteristics of model 300 and/or other characteristics of model 300, to facilitate its generation and the usage of the received weights.

The client device may be configured to generate machine learning model 300 using the weights received from (which may be stored by the encoding device). The client device may determine color attributes information for a particular frame, e.g., frame $F_1$ (FIG. 3), of 3D media content, by inputting a coordinate of the voxel (e.g., having been received from the encoding device as part of the encoded data) of the particular frame into the trained model 300. Such trained machine learning model 300 may be configured to output an identifier of a particular row in the generated data structure 200, e.g., having been received from the encoding device as part of the encoded data, which may be received as a bitstream. The decoding device may be configured to use the received data structure and the output identifier of data structure 200 to determine the color attributes information for the particular frame, and render the coordinates of such frame of the 3D media content based on the determined color attributes information associated with the output identifier. For inter-coded frames, e.g., accessed at 802, the client device may re-use the learned weights recovered in connection with the frame accessed at 702, and utilize the weights recovered in connection with the additional layers (e.g., layers 404, 406, and 408 of FIG. 4), to generate model 300 including additional layer(s) 400 and reconstruct the frame accessed at 802.

The codec application may be configured to determine the color for a particular coordinate of a voxel of a frame of 3D media content based on an identifier (e.g., of a particular row of data structure 200) output by trained model 300. For example, the codec application may determine that of the probabilities output by softmax layer 320 of trained model 300, row 204 has the highest probability of corresponding to an input voxel coordinate. Thus, in such example, the codec application may retrieve the R, G and B components for row 204 of data structure 200, and generate the color attributes 322 for the input voxel coordinate based on the single color corresponding to the retrieved R, G and B components for row 204. Such processes 700 and 800 may be repeated for any suitable number of voxel coordinates and for any suitable number of frames of the 3D media content. Processes 700 and 800 may continue until playing of 3D media content is complete or paused.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
accessing a frame of 3D media content; and
generating encoded data for the frame based at least in part on weights of a trained machine learning model and a data structure,
wherein, at a first time, the data structure is generated based at least in part on color attributes information of the frame, wherein each element of the data structure encodes a single color,
wherein to obtain the trained machine learning model, a machine learning model is trained, based at least in part on the frame of 3D media content, to receive as input a coordinate of a voxel of the frame, and to output, at a second time later than the first time, an identifier of a particular element in the data structure having been generated at the first time.

2. The method of claim 1, wherein the data structure is generated by applying vector quantization to the color attributes information of the frame, and wherein the data structure is a color table and the particular element is a row or column of the color table.

3. The method of claim 2, wherein the vector quantization is applied by applying K-means clustering to the color attributes information of the frame.

4. The method of claim 1, wherein the data structure is generated by applying vector quantization to color attributes of a plurality of sequential frames of the 3D media content, the plurality of sequential frames including the frame; and
the method further comprises generating a group of pictures (GOP) comprising the plurality of sequential frames, wherein the GOP is associated with the data structure.

5. The method of claim 1, further comprising:
transmitting the encoded data to a client device, the encoded data comprising an indication of the coordinate of the voxel of the frame, the weights of the trained machine learning model, and the generated data structure.

6. The method of claim 5, wherein the transmitting of the encoded data causes the client device to:
generate the trained machine learning model using the weights; and
determine the color attributes information for the frame by:
inputting the coordinate of the voxel of the frame into the trained machine learning model which outputs an identifier of a particular row in the generated data structure; and
using the generated data structure and the output identifier to determine the color attributes information for the frame; and
generate for display the frame of the 3D media content based at least in part on the determined color attributes information.

7. The method of claim 1, wherein the machine learning model comprises a softmax layer configured to output probabilities that respective candidate identifiers in the data structure correspond to color attributes of the input coordinate, and wherein a size of the softmax layer is based at least in part on a size of the data structure.

8. The method of claim 1, further comprising:
preprocessing the input to the machine learning model using a Fourier embedding layer.

9. A computer-implemented system comprising:
control circuitry configured to:
access a frame of 3D media content; and generate encoded data for the frame based at least in part on weights of a trained machine learning model and a data structure, wherein, at a first time, the data structure is generated based at least in part on color attributes information of the frame, wherein each element of the data structure encodes a single color, wherein to obtain the trained machine learning model, a machine learning model is trained, based at least in part on the frame of 3D media content, to receive as input a coordinate of a voxel of the frame, and to output, at a second time later than the first time, an identifier of a particular element in the data structure having been generated at the first time; and memory circuitry configured to store the encoded data.

10. The system of claim 9, further comprising a server, wherein the server is configured to generate the data structure by applying vector quantization to the color attributes information of the frame, and wherein the data structure is a color table and the particular element is a row or column of the color table.

11. The system of claim 10, wherein the server is configured to apply the vector quantization by applying K-means clustering to the color attributes information of the frame.

12. The system of claim 9, further comprising a server, wherein the server is configured to generate the data structure by applying vector quantization to color attributes of a plurality of sequential frames of the 3D media content, the plurality of sequential frames including the frame; and wherein the control circuitry is further configured to generate a group of pictures (GOP) comprising the plurality of sequential frames, wherein the GOP is associated with the data structure.

13. The system of claim 9, wherein the control circuitry is further configured to:

transmit the encoded data to a client device, the encoded data comprising an indication of the coordinate of the voxel of the frame, the weights of the trained machine learning model, and the generated data structure.

14. The system of claim 13, wherein the control circuitry is further configured to transmit the encoded data to cause the client device to:

generate the trained machine learning model using the weights; and determine the color attributes information for the frame by:

inputting the coordinate of the voxel of the frame into the trained machine learning model which outputs an identifier of a particular row in the generated data structure; and using the generated data structure and the output identifier to determine the color attributes information for the frame; and generate for display the frame of the 3D media content based at least in part on the determined color attributes information.

15. The system of claim 9, wherein the machine learning model comprises a softmax layer configured to output probabilities that respective candidate identifiers in the data structure correspond to color attributes of the input coordinate, and wherein a size of the softmax layer is based at least in part on a size of the data structure.

16. The system of claim 9, wherein the control circuitry is further configured to:

preprocess the input to the machine learning model using a Fourier embedding layer.

17. A computer-implemented method, comprising;

receiving, at a client device, encoded data for a frame of a 3D media content; and decoding the encoded data and generating for display the frame of the 3D media content, wherein:

the encoded data is generated based at least in part on weights of a trained machine learning model and a data structure, wherein, at a first time, the data structure is generated based at least in part on color attributes information of the frame, wherein each element of the data structure encodes a single color, and wherein to obtain the trained machine learning model, a machine learning model is trained, based at least in part on the frame of 3D media content, to receive as input a coordinate of a voxel of the frame, and to output, at a second time later than the first time, an identifier of a particular element in the data structure having been generated at the first time.

18. The method of claim 17, wherein the encoded data comprises an indication of the coordinate of the voxel of the frame, the weights of the trained machine learning model, and the generated data structure, the method further comprising:

decoding the encoded data by:

generating, at the client device, the trained machine learning model using the weights;

inputting the coordinate of the voxel of the frame into the trained machine learning model which outputs the identifier of the particular element in the generated data structure; and using the generated data structure and the output identifier to determine the color attributes information for the frame; and generating for display the frame of the 3D media content based at least in part on the determined color attributes information.

19. The method of claim 18, wherein the data structure is a color table and the particular element is a row or column of the color table.

20. The method of claim 18, wherein the data structure is generated by applying vector quantization to the color attributes information of the frame, wherein the vector quantization comprises applying K-means clustering to the color attributes information of the frame.

* * * * *